(12) United States Patent
Ogaki (10) Patent No.: US 10,110,821 B2
(45) Date of Patent: Oct. 23, 2018

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Koji Ogaki, Koza-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/686,810

(22) Filed: Aug. 25, 2017

(65) Prior Publication Data

US 2018/0063445 A1 Mar. 1, 2018

(30) Foreign Application Priority Data

Aug. 31, 2016 (JP) ................ 2016-169620

(51) Int. Cl.
*H04N 5/262* (2006.01)
*H04N 5/222* (2006.01)
*H04N 5/232* (2006.01)
*H04N 5/77* (2006.01)

(52) U.S. Cl.
CPC ....... *H04N 5/23293* (2013.01); *H04N 5/2228* (2013.01); *H04N 5/23245* (2013.01); *H04N 5/2628* (2013.01); *H04N 5/772* (2013.01)

(58) Field of Classification Search
CPC ........... H04N 5/23296; H04N 5/23245; H04N 5/2628
USPC ......................................... 348/240.99–240.2
See application file for complete search history.

(56) References Cited

U.S. PATENT DOCUMENTS

| | | | |
|---|---|---|---|
| 9,390,465 B2* | 7/2016 | Koh | G06T 3/0012 |
| 9,706,162 B2* | 7/2017 | Belisomi | H04N 7/0122 |
| 2007/0052832 A1* | 3/2007 | Bae | H04N 5/2251 348/333.12 |
| 2009/0021633 A1* | 1/2009 | Fukumoto | H04N 5/23209 348/362 |
| 2010/0134513 A1* | 6/2010 | Yui | G09G 5/00 345/589 |
| 2016/0219218 A1* | 7/2016 | Kinoshita | H04N 5/23241 |
| 2018/0131978 A1* | 5/2018 | Shaw | H04N 21/440245 |

FOREIGN PATENT DOCUMENTS

| | | |
|---|---|---|
| JP | 5-207412 A | 8/1993 |
| JP | 2001-211360 A | 8/2001 |

* cited by examiner

*Primary Examiner* — Ngoc-Yen Vu
(74) *Attorney, Agent, or Firm* — Canon USA, Inc. I.P. Division (57) ABSTRACT

An image processing apparatus performs control to generate a first video signal containing a video image in which a first range in an acquired image is resized to have a predetermined aspect ratio if the image processing apparatus is in a first mode of acquiring an image of a recording target region, and generate a second video signal containing a video image in which a second range different from the first range in the acquired image is resized in such a manner that an aspect ratio of the recording target region contained in the second range after the resizing matches the predetermined aspect ratio if the image processing apparatus is in a second mode of acquiring an image containing a peripheral region.

16 Claims, 5 Drawing Sheets

IMAGE PROCESSING APPARATUS, METHOD FOR CONTROLLING THE SAME, AND STORAGE MEDIUM

BACKGROUND OF THE INVENTION

Field of the Invention

The present invention relates to an image processing apparatus capable of recording an image and also displaying a condition of a periphery of the image to be recorded, and equipped with a function of resizing a part of this image to then display it, a method for controlling the image processing apparatus, and a storage medium.

Description of the Related Art

Conventionally, there has been known a function of displaying a video image of a periphery (a peripheral video image) of a region to be recorded as an image (a surround display) in an imaging apparatus. This function brings about a merit of further facilitating an adjustment of an imaging range at the time of imaging, such as allowing a user to confirm a condition of the periphery of the video region to be recorded, on a viewfinder of a camera or via an outward output, thereby allowing the user to prevent an unintended object from being contained in the image in advance. Japanese Patent Application Laid-Open No. 2001-211360 proposes a viewfinder capable of switching the surround display and a display of only the video image to be recorded.

On the other hand, there is a lens capable of imaging a further wider range with respect to a sensor having a same size by optically horizontally reducing (squeezing) the video image, which is called an anamorphic lens, than a normal lens. The anamorphic lens is used when a video image at a horizontally elongated aspect ratio of 2.39:1 (a cinema scope), which is often used in, for example, a movie, is captured with use of a camera equipped with a sensor having a normal aspect ratio of 16:9 or 4:3. The video image captured by the anamorphic lens should be displayed after being enlarged in an opposite direction from compression carried out by the lens (compression in one direction). Japanese Patent Application Laid-Open No. 5-207412 proposes a technique that converts information regarding a type of an image in a video signal to be recorded (whether the anamorphic lens is used) into a code signal and records this code signal together with the video signal, and automatically performs control such as enlargement when this video signal is played back and displayed. This technique allows a playback image restored from the compression (de-squeezed) to be displayed when the image captured with use of the anamorphic lens is played back.

If the de-squeezing processing like the example discussed in Japanese Patent Application Laid-Open No. 5-207412 is performed on the region for presenting the surround display like the example discussed in Japanese Patent Application Laid-Open No. 2001-211360, the aspect ratio of the displayed recording target region is unintentionally changed from the aspect ratio when the surround display is not presented. Therefore, for example, regarding the display of the recording target region that has been able to be confirmed at the aspect ratio of the cinema scope when having not been presented as the surround display, this display unintentionally loses the aspect ratio of the cinema scope by being presented as the surround display, which may confuse the user.

SUMMARY OF THE INVENTION

The present disclosure is directed to presenting an understandable display when the de-squeezing processing and the processing for the surround display are performed at the same time.

According to an aspect of the present invention, an image processing apparatus includes an acquisition unit configured to acquire an image containing a recording target region and a peripheral region to the recording target region, a switching unit configured to switch to a first mode, in which the acquisition unit acquires an image of the recording target region that does not contain the peripheral region, and a second mode, in which the acquisition unit acquires the image containing the peripheral region, a resizing unit configured to resize the image acquired by the acquisition unit, and a control unit configured to perform control to generate a first video signal containing a video image in which a first range in the image acquired by the acquisition unit is resized by the resizing unit to have a predetermined aspect ratio if the image processing apparatus is in the first mode, and generate a second video signal containing a video image in which a second range different from the first range in the image acquired by the acquisition unit is resized by the resizing unit in such a manner that an aspect ratio of the recording target region contained in the second range after the resizing matches the predetermined aspect ratio if the image processing apparatus is in the second mode.

According to another aspect of the present invention, an image processing apparatus includes an acquisition unit configured to acquire an image containing a recording target region and a peripheral region to the recording target region, a switching unit configured to switch to a first mode, in which the acquisition unit acquires an image of the recording target region that does not contain the peripheral region, and a second mode, in which the acquisition unit acquires the image containing the peripheral region, a resizing unit configured to resize the image acquired by the acquisition unit, a control unit configured to perform control to generate a video image in which a predetermined range in the image acquired by the acquisition unit is resized by the resizing unit to have a predetermined aspect ratio, and a display control unit configured to perform control to display the video image in such a manner that a range not displayed in the first mode in a region corresponding to the recording target region in the video image is distinguishable from a region corresponding to the peripheral region if the image processing apparatus is in the second mode.

Further features of the present invention will become apparent from the following description of exemplary embodiments with reference to the attached drawings.

DESCRIPTION OF THE EMBODIMENTS

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

In the following description, an exemplary embodiment of the present invention will be cited with reference to the drawings. In the present exemplary embodiment, a digital camera 100, which is an imaging apparatus capable of capturing and recording a moving image, will be described as one example of an image processing apparatus according to the present invention.

Figure 1A:
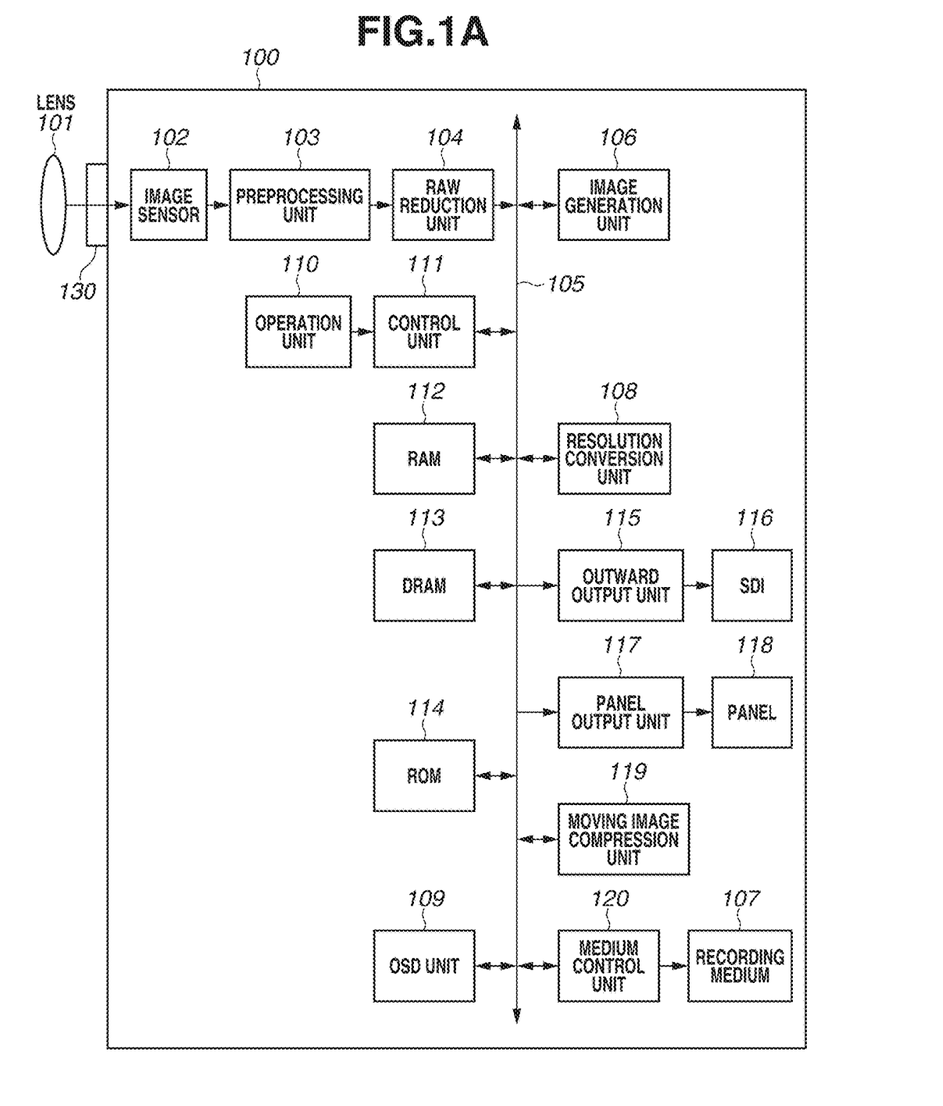
FIG. 1A is a hardware block diagram illustrating an example of an internal configuration of a digital camera.
Figure 1B:
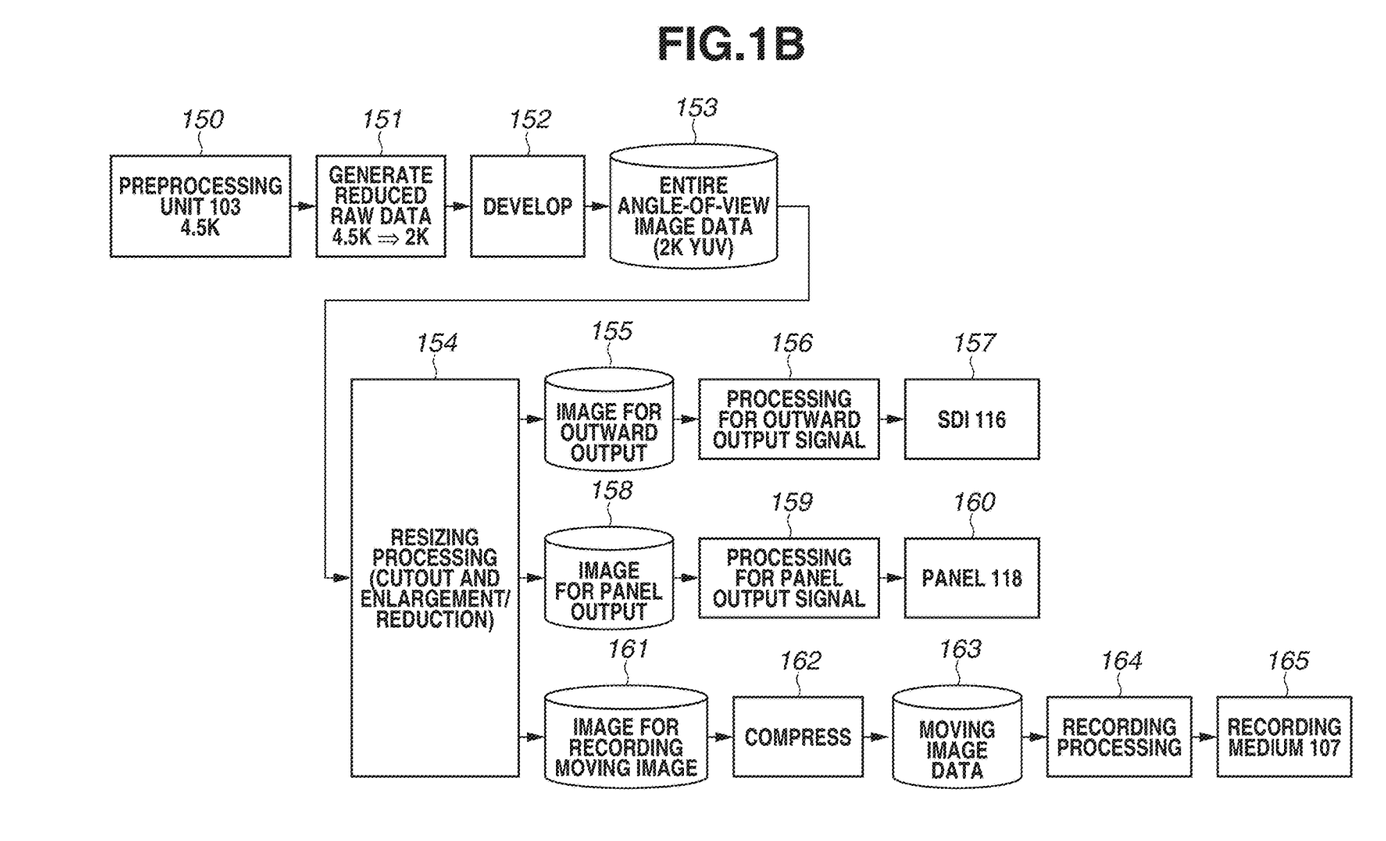
FIG. 1B is a functional block diagram illustrating a data path of image processing performed by the digital camera.

FIG. 1A is a hardware block diagram illustrating an example of an internal configuration of the digital camera 100 according to the present exemplary embodiment. FIG. 1B is a functional block diagram illustrating a data path of image processing performed by the digital camera 100. The number of pixels in each process when an image captured at 4.5 K (4504×2376) containing a surround region is displayed at 2K (2048×1080) by way of example is indicated in each of blocks 150 and 151 illustrated in FIG. 1B. Needless to say, this is not necessarily applicable to a case where at least one of the number of pixels in the captured image and the number of pixels to be recorded is a different setting of the number of pixels.

In FIG. 1A, a lens unit 101 includes a fixed lens group for concentration of light, a magnification varying lens group, a diaphragm, and a correction lens group having both a function of correcting an image-forming position displaced due to a movement of the magnification varying lens group and a function of carrying out a focus adjustment. Eventually, an object image is formed by the lens unit 101 on an image-forming plane of an image sensor 102, which will be described below. The lens unit 101 is a configuration included in an exchangeable lens mountable on a lens mounting unit 130, and is not necessarily configured as the above-described lens group depending on the mounted exchangeable lens. Lenses mountable on the lens mounting unit 130 include an anamorphic lens that optically reduces (squeezes) the object image formed on the image sensor 102 by half transversely (horizontally) (a compression ratio thereof is 2:1). Further, the lenses mountable on the lens mounting unit 130 also include, for example, an anamorphic lens that optically reduces (squeezes) the object image to 1/1.3 transversely (horizontally) (a compression ratio thereof is 1.3:1).

The image sensor 102 converts the light into an electric charge to generate an imaging signal. The generated imaging signal is output to a preprocessing unit 103. The image sensor 102 is an image sensor such as a charge coupled device (CCD) image sensor or a complementary metal-oxide semiconductor (CMOS) image sensor.

The preprocessing unit 103 converts the imaging signal acquired by being input from the image sensor 102 into RAW data (a RAW image) that a RAW reduction unit 104 can receive, and outputs the converted RAW data to the RAW reduction unit 104 (the block 150).

The RAW reduction unit 104 generates reduced RAW data (a reduced RAW image) into which the RAW data generated by the preprocessing unit 103 is reduced at a predetermined ratio, and outputs the generated reduced RAW data to an image generation unit 106 (generation of a reduced image in the block 151). For example, when a surround display is turned on, the RAW reduction unit 104 generates reduced RAW data of 2048×1080 by reducing RAW data of 4504×2376 pixels in such a manner that this data is reduced to 116/255 horizontally and 5/11 vertically (rounded down to the nearest whole number), and outputs the generated reduced RAW data to the image generation unit 106. When the surround display is disabled, the RAW reduction unit 104 generates reduced RAW data of 2048×1080 by reducing RAW data of 4096×2160 pixels that is input from the preprocessing unit 103 in such a manner that this data is reduced by half both horizontally and vertically, and outputs the generated reduced RAW data to the image generation unit 106. Alternatively, when the data input from the preprocessing unit 103 is not supposed to be reduced, the RAW data is output to the image generation unit 106 without the reduction processing performed thereon.

A bus 105 is a data bus used for each of the blocks of the digital camera 100 to exchange data, and each of the blocks of the digital camera 100 exchanges the data via this bus 105.

The image generation unit 106 generates entire angle-of-view image data in a YUV format by performing RAW development processing, such as interpolation processing and image quality adjustment processing, on the reduced RAW data input from the RAW reduction unit 104 (a block 152), and stores the generated entire angle-of-view image dada into a dynamic random access memory (DRAM) 113 (a block 153). The entire angle-of-view image data is an entire range of the captured image that contains a recording target region and a peripheral region when the surround display is enabled, and is developed data in which the entire image is handled as the recording range when the surround display is disabled. In other words, the DRAM 113 can acquire an image as the entire range of the captured image that contains the recording target region and the peripheral region, and a developed image in which the entire image is handled as the recording range.

Examples of a recording medium 107 include a memory card. This recording medium 107 is a detachably attachable recording medium detachable from the digital camera 100, and can also be mounted on, for example, a personal computer (PC), besides the digital camera 100.

A resolution conversion unit 108 converts a resolution of the YUV data generated by the image generation unit 106 (a block 154). The resolution conversion unit 108 can perform enlargement or reduction processing (resizing) on the entire angle-of-view image data stored in the DRAM 113 independently for each of the vertical direction and the horizontal direction. The resolution conversion unit 108 performs the resizing processing according to whether the surround display is in an enabled/disabled state and whether a de-squeezed display is in an enabled/disabled state, and generates an image resized to a resolution to be output to an outward output unit 115 (the block 154). The generated image for the output is stored into the DRAM 113 as different image data from the input YUV data (a block 155). Similarly, the resolution conversion unit 108 generates an image for a panel output that is resized to a resolution to be output to a panel 118 (the block 154), and stores the generated image into the DRAM 113 (a block 158). Similarly, the resolution conversion unit 108 generates an image for recording the moving image that is resized to a resolution to be subjected to moving image compression by a moving image compression unit 119 (the block 154), and stores the generated image into the DRAM 113 (a block 161). The resolution conversion unit 108 can resize the image in a different manner individually independently for each of the output destinations (the block 155, the block 158, and the block 161). Further, the resolution conversion unit 108 can cut out the image and resize the image at the same time by limiting a readout range to a part of the image data with respect to the entire angle-of-view image data stored in the DRAM 113. For example, suppose that, when an upper left of the image data is a coordinate origin (0, 0), readout start coordinates, a readout resolution, and an output resolution are set to (378, 0), 1292×1080, and 2048×856, respectively. In this case, image data having a size of the resolution 1292×1080 is read out from the original image data, with (378, 0) set to a starting point. Then, the readout image data is subjected to processing for enlarging it by 65/41 times horizontally and processing for reducing it to 65/82 vertically (both rounded down to the nearest whole number), and image data of 2048×856 is stored into the DRAM 113.

An On Screen Display (OSD) unit 109 generates an OSD data (a display item), such as various kinds of setting menus or a face frame, and disposes the generated OSD data into the DRAM 113.

An operation unit 110 is used for a user to input an operation, and is, for example, a touch panel and/or an operation key (a button, a dial, a lever, and/or the like). When the user operates the operation unit 110, a control unit 111 is notified of operation information. The enabled/disabled state of the surround display and the enabled/disabled state of the anamorphic de-squeezed display can be individually independently set according to the input from the operation unit 110. How to set them may be a menu operation or may be an operation of a dedicated physical key.

The control unit 111 is a processing unit including a central processing unit (CPU) and/or the like, and controls each of the blocks included in the digital camera 100.

A random access memory (RAM) 112 is a volatile memory that the control unit 111 uses as a work area.

The DRAM 113 is a volatile memory that each of the blocks of the digital camera 100 uses as a work area. This DRAM 113 is subject to an upper limit on a data amount that can be output and input (read and written) for a predetermined time period (a reading speed and a writing speed), and data cannot be read and written therefrom and therein beyond this upper limit. The DRAM 113 can also be replaced with a high-speed volatile memory or nonvolatile memory based on a different mechanism from the DRAM. Further, the RAM 112 and the DRAM 113 may be configured to coexist in the same storage device.

A read only memory (ROM) 114 is a nonvolatile recording medium storing therein, for example, a program to be executed by the control unit 111, and is embodied with use of, for example, a flash ROM. Alternatively, program data stored in the recording medium 107 may be loaded into the RAM 112, and this RAM 112 may be used as the ROM.

The outward output unit 115 combines the image for the outward output that is stored in the DRAM 113 (the block 155) and the OSD data, and outputs the combined data to a serial digital interface (SDI) 116 as a signal for the outward output (a block 156).

The SDI 116 changes the signal for the outward output that is input from the outward output unit 115 into the SDI format, and outputs the changed signal to the outside (a block 157).

A panel output unit 117 combines the image for the panel output that is stored in the DRAM 113 (the block 158) and the OSD data, and outputs the combined data to the panel 118 as a signal for the panel output (the block 159).

The panel 118 is a display panel, such as a liquid crystal panel and an organic electroluminescence (EL) panel, and displays the signal for the panel output that is input from the panel output unit 117 (a block 160).

The moving image compression unit 119 compresses an image for recording a moving image that is stored in the DRAM 113 according to the Moving Picture Experts Group (MPEG) format (a block 162), and stores the compressed image into the DRAM 113 as moving image data (a block 163).

A medium control unit 120 records the moving image data generated by the moving image compression unit 119 and stored in the DRAM 113 (the block 163) into the recording medium 107 according to a format compatible with a computer (a block 164 and a block 165).

Subsequently, an operation of the digital camera 100 relating to the present exemplary embodiment will be described with reference to a flowchart illustrated in FIG. 2. The control unit 111 controls each of the units of the digital camera 100 based on the program stored in the ROM 114, by which this flow is realized. Further, FIGS. 3A to 3D each illustrate a video image stored in the DRAM 113 and a display example when the video image output to the SDI 116 is displayed on a display that is the output destination, during the operation of the flowchart illustrated in FIG. 2. Display examples 320 to 323 are each display example when the present exemplary embodiment is applied. A display example 323' is a display example when the present technique is not applied. A rhombus and a circle (or an ellipse) in each of the display examples each indicate an object in the captured image captured by the image sensor 102. When an object having a true circle shape is imaged with use of the anamorphic lens, the image is optically squeezed to be compressed horizontally, so that the image is formed on the image sensor 102 and captured as a vertically elongated elliptic object. This image is displayed as the vertically elongated elliptic object if being displayed without any processing performed thereon, but can be displayed after being restored to the true circle by being subjected to the de-squeezing processing. The present exemplary embodiment will be described based on the de-squeezed display when the anamorphic lens having the compression ratio of 2:1 is mounted, but can be applied by changing a cutout range and a de-squeezing ratio when an anamorphic lens having another compression ratio is mounted.

Figure 2:
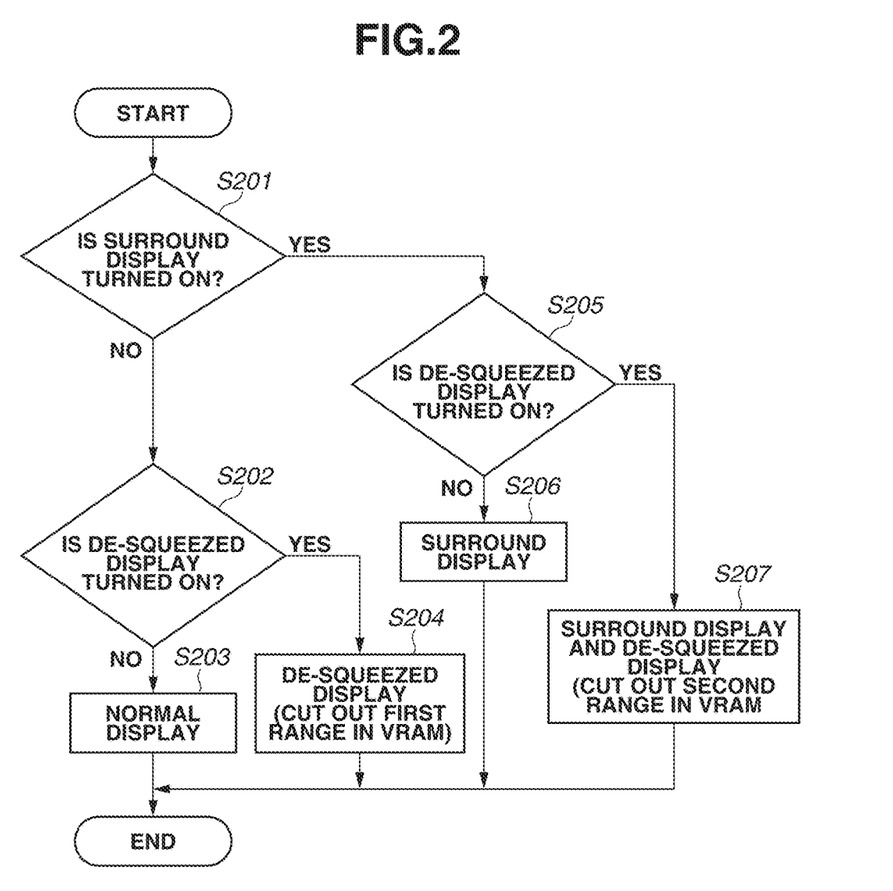
FIG. 2 is a flowchart illustrating an operation of the digital camera.

When the digital camera 100 is started up in an imaging mode and the image sensor 102 starts capturing a live view image, the processing illustrated in FIG. 2 is started. Assume that the processing illustrated in FIG. 2 can be performed both when the digital camera 100 is recording the captured image into the recording medium 107 and when the digital camera 100 is waiting to record the captured image before starting the recording. When the digital camera 100 is waiting to record the captured image, the recording target region, which will be described below, is not a region already recorded at this point but is a region of the video image to be recorded into the recording medium 107 when the recording is started from this point. Assume that the user sets (switches) the ON/Off setting of the surround display and the ON/OFF setting of the de-squeezed display, from a menu screen or the like in advance, and the set state is recorded in the RAM 112 or the ROM 114. Further, assume that the settings can be changed according to a user operation even while the live view image is displayed.

In step S201, the control unit 111 determines whether the surround display is set to be enabled (turned on) by referring to the setting information in the RAM 112 or the ROM 114. If the surround display is set to be enabled (turned on) (a second mode) (YES in step S201), the processing proceeds to step S205. If the surround display is set to be disabled (turned off) (a first mode) (NO in step S201), the processing proceeds to step S202.

In step S202, the control unit 111 determines whether the de-squeezed display is set to be enabled (turned on) by referring to the setting information in the RAM 112 or the ROM 114. If the de-squeezed display is set to be enabled (turned on) (a second setting) (YES in step S202), the processing proceeds to step S204. If the de-squeezed display is set to be disabled (turned off) (a first setting) (NO in step S202), the processing proceeds to step S203.

In step S203, the control unit 111 outputs the video image with the surround display disabled and the de-squeezed display disabled to the SDI 116.

Figure 3A:
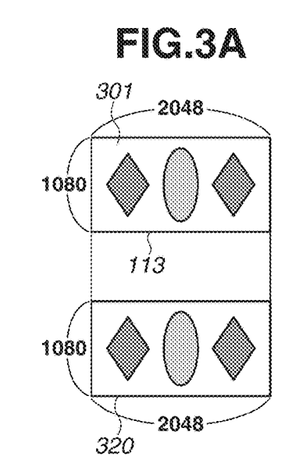
FIGS. 3A to 3D each illustrate a video image in a dynamic random access memory (DRAM) and a display example of an output video image from a serial digital interface (SDI).

FIG. 3A illustrates a relationship between the video image stored in the DRAM 113 and the video image output to the SDI 116 when the normal display in step S203 is presented. A video image 301 is the YUV image generated by the image generation unit 106 and stored in the DRAM 113. A display example 320 is a display example of the video image output from the SDI 116 and displayed on the display that is the output destination, according to the normal display. The display example 320 indicates a video image of 2048×1080 pixels, and an entire region of the displayed video image is set as a region targeted for the recording (the recording target region) therein. At the time of the normal display, the resolution conversion unit 108 does not perform the resizing processing, so that the display example 320 has the same angle of view (imaging range) as the video image 301.

In step S204, the control unit 111 outputs the video image with the surround display disabled and the de-squeezed display enabled to the SDI 116. In other words, the control unit 111 outputs the video image of the normal de-squeezed display.

Figure 3B:
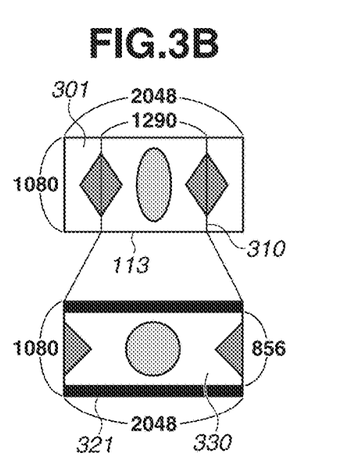

FIG. 3B illustrates a relationship between the video image stored in the DRAM 113 and the video image output to the SDI 116 when the de-squeezed display in step S204 is presented. The video image 301 is the YUV image generated by the image generation unit 106 and recorded in the DRAM 113. The video image 301 is 2048 pixels horizontally×1080 pixels vertically, and is the same angle of view (imaging range) as the video image 301 illustrated in FIG. 3A. A display example 321 is a display example of the video image output from the SDI 116 and displayed on the display that is the output destination, according to the de-squeezed display in step S204. In the video image 301 stored in the DRAM 113, a range 310 of 1290×1080 pixels at an image center that corresponds to an effective video region of the anamorphic lens having the compression ratio of 2:1 is cut out, and is displayed after being resized so as to have the aspect ratio of 2.39:1 as an aspect ratio when being displayed. A content of the processing will be described in further detail now. The resolution conversion unit 108 cuts out the range 310 (1290×1080 pixels), and enlarges the cutout video signal so as to double a horizontal width thereof (2560×1080 pixels). After that, the resolution conversion unit 108 reduces the video image to the 2048×856 size to display the video image in the range of 2048×1080 pixels without changing the aspect ratio (2.39:1). In other words, in these magnification varying processing procedures (the de-squeezing), the resolution conversion unit 108 performs magnification varying processing at a magnification ratio different between the horizontal direction and the vertical direction. The resolution conversion unit 108 may either change the video image so as to double the horizontal width thereof and then entirely reduce this video image after that, or directly resize a first region in the DRAM 113 to the final size (2048×856 pixels).

Further, the video image should be output to the SDI 116 at the resolution of 2048×1080 pixels according to the SDI standards. Therefore, the outward output unit 115 adds black color as the video signal for a region corresponding to a pixel shortage, and the video signal of 2048×1080 pixels is output to the SDI 116 (the block 156). As a result, the video image is displayed as indicated by the display example 321 on the display that is the destination of the output from the SDI 116. In the display example 321, a video image 330 generated by de-squeezing the captured image is displayed in the range of 2048×856 pixels.

In step S205, the control unit 111 determines whether the de-squeezed display is set to be enabled (turned on) by referring to the setting information in the RAM 112 or the ROM 114. If the de-squeezed display is set to be enabled (turned on) (YES in step S205), the processing proceeds to step S207. If not (NO in step S205), the processing proceeds to step S206.

In step S206, the control unit 111 outputs the video image with the surround display enabled and the de-squeezed display disabled to the SDI 116. In other words, the control unit 111 outputs the video image of the normal surround display.

Figure 3C:
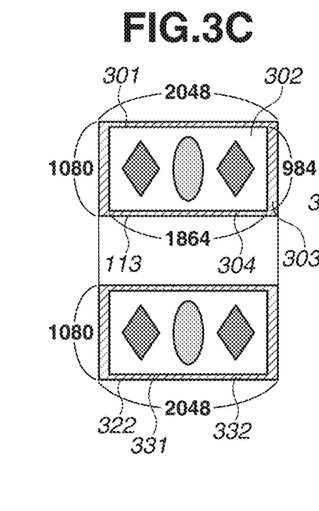

FIG. 3C illustrates a relationship between the video image stored in the DRAM 113 and the video image output to the SDI 116 when the surround display in step S206 is presented. A video image 302 is the YUV image generated by the image generation unit 106 and recorded in the DRAM 113. The video image 302 is 2048 pixels horizontally×1080 pixels vertically, but is a different angle of view (imaging range) from the video image 301 illustrated in FIG. 3A and is a wider angle of view (imaging range) than the video image 301 by an amount corresponding to inclusion of even the surround region. More specifically, when the surround display is enabled, the RAW data of 4504×2376 pixels containing peripheral pixels (in this RAW data, the recording target region is 4096×2260 pixels) is output from the preprocessing unit 103 to the RAW reduction unit 104. The RAW reduction unit 104 carries out the reduction in such a manner that the RAW data is reduced to 116/255 horizontally and 5/11 vertically (rounded down to the nearest whole number) to generate the reduced RAW data of 2048×1080 pixels (the resolution indicated as the example in the block 151), and outputs the generated reduced RAW data to the image generation unit 106. The video image 302 acquired by developing this reduced RAW data of 2048×1080 pixels is stored in the DRAM 113. A surround region 303 (a shaded portion in FIG. 3C) in the video image 302 indicates the peripheral region of the video image not to be recorded into the recording medium 107 even when the recording is started. A recording target region 304 in the video image 302 indicates the region of the video image to be recorded into the recording medium 107. The digital camera 100 may draw a white line at a boundary as a graphical user interface (GUI) or display a translucent GUI component superimposed on a range where a video image of the peripheral region is displayed so as to allow the user to distinguish the surround region 303 and the recording target region 304 from each other. A display example 322 is a display example of the video image output from the SDI 116 and displayed on the display that is the output destination according to the surround display in step S206. When this video image 302 is output to the SDI 116 without being subjected to the de-squeezing processing, the display example 322 has the same angle of view (imaging range) as the video image 302. In the display example 322, a recording target region 331 and a surround region 332 peripheral thereto in the image acquired by being captured is displayed distinguishably from each other.

In step S207, the control unit 111 outputs the video image with the surround display enabled and the de-squeezed display enabled to the SDI 116. In other words, the control unit 111 outputs the video image in which the de-squeezing processing and the surround display are combined.

Figure 3D:
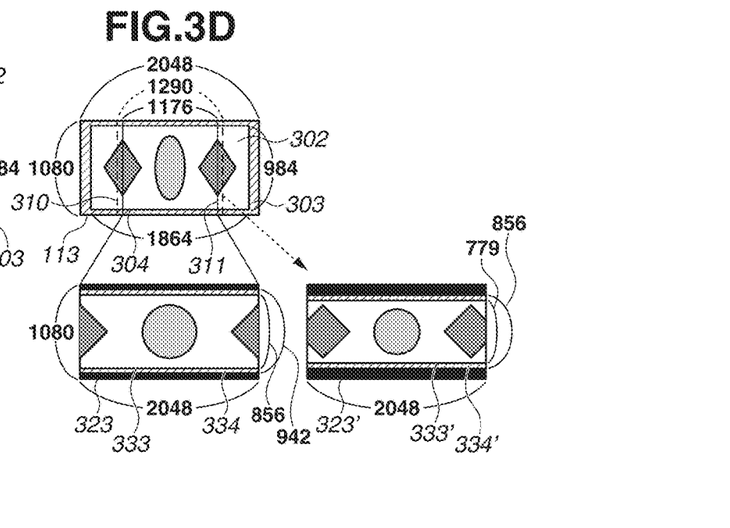

FIG. 3D illustrates a relationship between the video image stored in the DRAM 113 and the video image output to the SDI 116 when the display in step S207 is presented. The video image 302 is the YUV image generated by the image generation unit 106 and recorded in the DRAM 113, and the video image having the same angle of view (imaging range) as the video image 302 illustrated in FIG. 3C and generated in a similar manner to the video image 302 illustrated in FIG. 3C. A display example 323 is a display example of the video image output from the SDI 116 and displayed on the display that is the output destination according to the display in step S207. In this processing, a range 311 of 1176×1080 pixels at an image center that corresponds to the effective video region of the anamorphic lens having the compression ratio of 2:1 is cut out from the video image 302 (the YUV image) of 2048×1080 pixels containing the surround region that is stored in the DRAM 113. Then, the range 311 is resized (de-squeezed) in such a manner that a range corresponding to the recording target region 304 after the resizing has the aspect ratio of 2.39:1 (2048×856) when being displayed. A content of the processing will be described in further detail now. The resolution conversion unit 108 cuts out the range 311 (1176×1080 pixels), and enlarges the cutout video signal so as to double a horizontal width thereof (2356×1080 pixels). After that, the resolution conversion unit 108 reduces the video image to the 2048×942 size. The resolution conversion unit 108 may either change the video signal so as to double the horizontal width thereof and then entirely reduce this video image after that, or directly resize the range 311 in the DRAM 113 to the final size (2048×942 pixels). Further, the video image should be output to the SDI 116 at the resolution of 2048×1080 pixels according to the SDI standards. Therefore, the outward output unit 115 adds black color as the video signal for a region corresponding to a pixel shortage, and the video signal of 2048×1080 pixels is output to the SDI 116 (the block 156). As a result, the video image is displayed as indicated by the display example 323 on the display that is the destination of the output from the SDI 116. A range of 2048×856 pixels and shaded portions above and below it in the range of 2048×942 pixels where the captured image is displayed, which is indicated in the display example 323, are a recording target region 333 and a surround region 334, respectively. The recording target region 333 in the display example 323 and the video region 330 in the de-squeezed display (the display example 321) unaccompanied by the surround display have the same aspect ratios and the same angles of view (ranges) as each other. In other words, the display example 323 is a display equivalent to the video region 330 in the display example 321 to which the surround region 334 is added thereto above and below it. Such a display allows the user to confirm the recording target region at a desired aspect ratio (the cinema scope 2.39:1) even when using the surround display and the de-squeezed display in combination. Therefore, the user can prevent an unnecessary object from being mixed in the recording target region 333 by viewing the surround region 334, and also easily visualize a completed product of video work by viewing the recording target region at the aspect ratio expected as the completed product.

Assume that the processing illustrated in FIG. 2 is performed every time the setting state (ON or OFF) of the de-squeezed display or the setting state (ON or OFF) of the surround display is changed while the digital camera 100 is waiting to capture the image or is recording the image.

Further, the processing illustrated in FIG. 2 has been described as the processing performed on the video image to be output to the SDI 116, but similar processing is also performed on the video image to be displayed on the panel 118. The control unit 111 performs control so as to present the display like the display examples 320 to 323 on the panel 118 in steps S203, S204, S206, and S207, respectively, as display control on the panel 118. Further, the processing illustrated in FIG. 2 has been described as the processing performed on the video image to be output to the SDI 116, but the video output standard used here is not limited to the SDI standards as long as this is a method for outputting (transmitting) the video signal and may be another video output standard, such as High-Definition Multimedia Interface (HDMI) (registered trademark).

In the processing performed when the surround display and the de-squeezed display are combined, according to the present exemplary embodiment (step S207), the range 311 different from the range 310, which is cut out at the time of the de-squeezing processing when the surround display is not presented (step S204), is cut out. To make an effect from such an operation easily understandable, hypothetically supposing that the same range as the range 310, which is cut out at the time of the de-squeezing processing when the surround display is not presented, is cut out even in the processing performed when the surround display and the de-squeezed display are combined, what kind of result is yielded in this case will be described next.

A display example 323' illustrated in FIG. 3D is a display example when the same range as the range 310, which is cut out at the time of the de-squeezing processing when the surround display is not presented, is cut out at the time of the processing performed when the surround display and the de-squeezed display are combined. In this processing, the resolution conversion unit 108 cuts out the range 310 (1290×1080 pixels) from the video image 302 (the YUV image) of 2048×1080 pixels containing the surround region that is stored in the DRAM 113. Then, the resolution conversion unit 108 enlarges (de-squeezes) the cutout video signal so as to double the horizontal width thereof (2580×1080 pixels). After that, the resolution conversion unit 108 reduces the video image to the 2048×856 size so as to display the video image in the range of 2048×1080 pixels. The outward output unit 115 adds black color as the video signal for a region corresponding to a pixel shortage, and the video signal of 2048×1080 pixels is output to the SDI 116. As a result, the video image is displayed as indicated by the display example 323' on the display that is the destination of the output from the SDI 116. In the video image displayed in this manner, a recording target region 333' has an aspect ratio of 2048×779 pixels, and does not have the cinema scope (2.39:1). Further, the angle of view of the recording target region (the displayed range of the video image) is unintentionally horizontally extended (even a portion outside the rhombus appears in this case), and the aspect ratio is undesirably changed, compared to the display example 321 of the de-squeezed display unaccompanied by the surround display. Therefore, this result leads to occurrence of such inconvenience that the user cannot view the recording target region at the aspect ratio and in the video range expected as the completed product, and therefore cannot easily visualize the completed product of the video work. On the other hand, the present exemplary embodiment can prevent such inconvenience by presenting the display like the above-described display example 323. Further, in the display example 323 according to the present exemplary embodiment, the angle of view and the aspect ratio of the recording target region when it is displayed are not changed in such a scene that the surround display is switched to be enabled or disabled during the de-squeezed display, which allows the user to use both the functions at the same time without reducing the convenience.

Exemplary Modification

An exemplary modification will be described based on an example in which, if the de-squeezed display is enabled when the surround display is enabled (if the control unit 111 determines YES in step S205 in the above-described drawing, FIG. 2), the cutout range is not changed and the video image is displayed so as to make the desired aspect ratio and video range distinguishable, instead of the processing in the above-described step, step S207.

Figure 4:
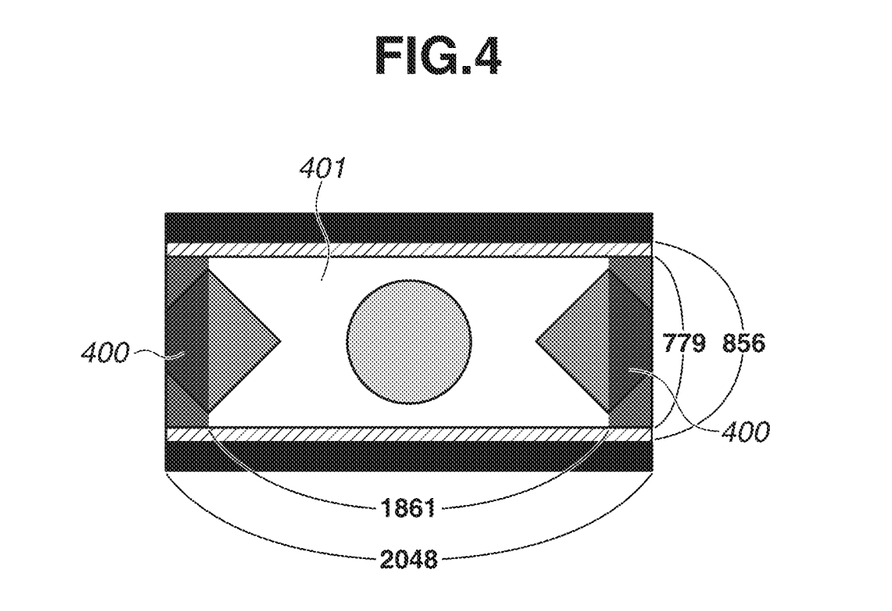
FIG. 4 illustrates a display of an output video image from the SDI according to an exemplary modification.

FIG. 4 illustrates a display example according to the exemplary modification if the de-squeezed display is enabled when the surround display is enabled (if the control unit 111 determines YES in step S205 in the above-described drawing, FIG. 2). A display item 400 is a display item distinguishably indicating a region that is the recording target region (a region contained in the recording target region 304) and is also located outside the effective range of the anamorphic lens (outside the range defined by the aspect ratio of the cinema scope). In the present exemplary embodiment, the target region is translucently painted out, but this display may be realized in a manner drawing a line at a boundary of the region. A region 401 corresponds to the video image that is the recording target region and is also the effective range of the anamorphic lens, and is resized so as to have the aspect ratio of 2.39:1 (1861×779 pixels). Further, the region 400 is an imaging range in the recording target region that is not displayed in the de-squeezed display unaccompanied by the surround display (the display example 321). The region 401 is an imaging range displayed even in the de-squeezed display unaccompanied by the surround display (the display example 321).

According to the exemplary modification configured in this manner, the digital camera 100 can allow the user to easily confirm the portion that is recorded but is located outside the effective region of the anamorphic lens, on the video image by indicating the angle of view/the aspect ratio of the recording target region with use of the display on the GUI without changing the cutout range from the range 310.

Regarding the above-described various kinds of control that have been described assuming that the control unit 111 performs them, a single hardware device may perform them, or a plurality of hardware devices may control the entire apparatus by dividing the processing among them.

Further, having been described the present invention in detail based on the representative exemplary embodiments thereof, the present invention is not limited to these specific exemplary embodiments, and also covers various embodiments within a range that does not depart from the spirit of the present invention. Further, each of the above-described exemplary embodiments merely indicates one exemplary embodiment of the present invention, and the individual exemplary embodiments can also be combined arbitrarily.

Further, the above-described exemplary embodiments have been described based on the example in which the present invention is applied to the digital camera 100, but the applicability of the present invention is not limited to this example, and the present invention can be applied to any image processing apparatus that performs control so as to resize and then display an input image. For example, the present invention can be applied to such a moving image recorder that enlarges a moving image input from an external input terminal to output it to a display device, and also records this moving image into an external or built-in recording medium. Similarly, the present invention can be applied to a personal computer, a personal digital assistant (PDA), a mobile phone terminal, a mobile image viewer, a printer apparatus including a display, a digital photo frame, and the like. Further, the present invention can be applied to a music player, a game machine, an electronic book reader, a tablet terminal, a smart-phone, a projector, home electronics and an in-vehicle apparatus including a display, and the like.

According to the present invention, a further easily understandable display can be presented when the de-squeezing processing and the surround processing are performed at the same time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-169620, filed Aug. 31, 2016, which is hereby incorporated by reference herein in its entirety.

What is claimed is:
1. An image processing apparatus comprising:
an acquisition unit configured to acquire an image containing a recording target region and a peripheral region to the recording target region;

a switching unit configured to switch to a first mode, in which the acquisition unit acquires an image of the recording target region that does not contain the peripheral region, and a second mode, in which the acquisition unit acquires the image containing the peripheral region;

a resizing unit configured to resize the image acquired by the acquisition unit; and a control unit configured to perform control to generate a first video signal containing a video image in which a first range in the image acquired by the acquisition unit is resized by the resizing unit to have a predetermined aspect ratio if the image processing apparatus is in the first mode, and generate a second video signal containing a video image in which a second range different from the first range in the image acquired by the acquisition unit is resized by the resizing unit in such a manner that an aspect ratio of the recording target region contained in the second range after the resizing matches the predetermined aspect ratio if the image processing apparatus is in the second mode.

2. The image processing apparatus according to claim 1, wherein the resizing unit resizes the image at a magnification ratio different between a horizontal direction and a vertical direction.

3. The image processing apparatus according to claim 1, wherein the resizing unit performs de-squeezing processing.

4. The image processing apparatus according to claim 1, further comprising a display control unit configured to perform control to display the first video signal on a display unit if the image processing apparatus is in the first mode, and display the second video signal on the display unit if the image processing apparatus is in the second mode.

5. The image processing apparatus according to claim 4, further comprising a setting unit configured to be able to set at least any of a first setting of displaying the video image without resizing it at a magnification ratio different between a horizontal direction and a vertical direction by the resizing unit, and a second setting of displaying the video image after resizing it at the magnification ratio different between the horizontal direction and the vertical direction by the resizing unit, wherein the display control unit performs control to display the first video signal on the display unit if the image processing apparatus is in the first mode and is set to the second setting, and display the second video signal on the display unit if the image processing apparatus is in the second mode and is set to the second setting.

6. The image processing apparatus according to claim 5, wherein the setting unit is a unit configured to set whether to perform de-squeezing processing.

7. The image processing apparatus according to claim 1, wherein the first mode is a mode of not presenting a surround display, and the second mode is a mode of presenting the surround display.

8. The image processing apparatus according to claim 1, wherein the image is an image captured by an imaging unit, and wherein an imaging range to which a horizontal range of the second range corresponds is the same as an imaging range to which a horizontal range of the recording target region contained in the first range corresponds.

9. The image processing apparatus according to claim 1, wherein the image is an image captured with use of an anamorphic lens.

10. The image processing apparatus according to claim 1, further comprising:

a lens mounting unit configured to allow an anamorphic lens to be mounted thereon; and an imaging unit, wherein the acquisition unit acquires an image captured by the imaging unit.

11. The image processing apparatus according to claim 1, wherein the first video signal and the second video signal are the same in size.

12. A method for controlling an image processing apparatus, the method comprising:

acquiring an image containing a recording target region and a peripheral region to the recording target region;

switching to a first mode, in which an image of the recording target region that does not contain the peripheral region is acquired, and a second mode, in which the image containing the peripheral region is acquired;

resizing the acquired image; and performing control to generate a first video signal containing a video image in which a first range in the acquired image is resized to have a predetermined aspect ratio if the image processing apparatus is in the first mode, and generate a second video signal containing a video image in which a second range different from the first range in the acquired image is resized in such a manner that an aspect ratio of the recording target region contained in the second range after the resizing matches the predetermined aspect ratio if the image processing apparatus is in the second mode.

13. An image processing apparatus comprising:

an acquisition unit configured to acquire an image containing a recording target region and a peripheral region to the recording target region;

a switching unit configured to switch to a first mode, in which the acquisition unit acquires an image of the recording target region that does not contain the peripheral region, and a second mode, in which the acquisition unit acquires the image containing the peripheral region;

a resizing unit configured to resize the image acquired by the acquisition unit;

a control unit configured to perform control to generate a video image in which a predetermined range in the image acquired by the acquisition unit is resized by the resizing unit to have a predetermined aspect ratio; and a display control unit configured to perform control to display the video image in such a manner that a range not displayed in the first mode in a region corresponding to the recording target region in the video image is distinguishable from a region corresponding to the peripheral region if the image processing apparatus is in the second mode.

14. A method for controlling an image processing apparatus, the method comprising:

acquiring an image containing a recording target region and a peripheral region to this recording target region;

switching to a first mode, in which an image of the recording target region that does not contain the peripheral region is acquired, and a second mode, in which the image containing the peripheral region is acquired;

resizing the acquired image;

performing control to generate a video image in which a predetermined range in the image acquired is resized to have a predetermined aspect ratio; and performing display control to display the video image in such a manner that a range not displayed in the first mode in a region corresponding to the recording target region in the video image is distinguishable from a region corresponding to the peripheral region if the image processing apparatus is in the second mode.

15. A non-transitory computer-readable storage medium storing a program for causing a computer to function as each of the units of the image processing apparatus according to claim 1.

16. A non-transitory computer-readable storage medium storing a program for causing a computer to function as each of the units of the image processing apparatus according to claim 13.

* * * * *